May 1, 1928.  
O. S. CAESAR  
1,668,491  
HEATING APPARATUS FOR AUTOMOTIVE VEHICLES  
Filed Feb. 7, 1927
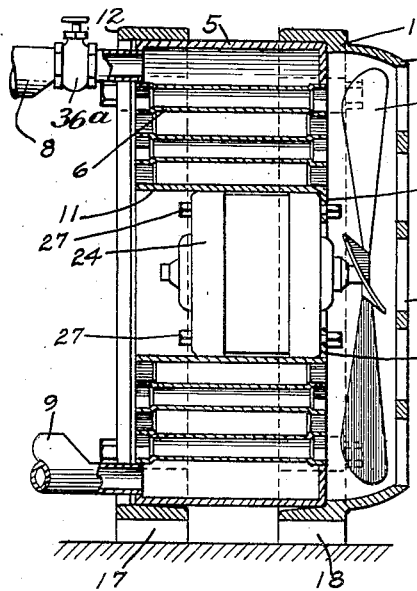
Fig. 1
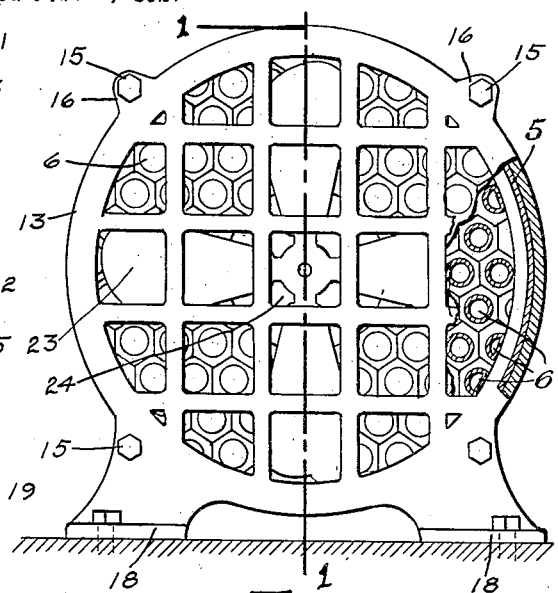
Fig. 2
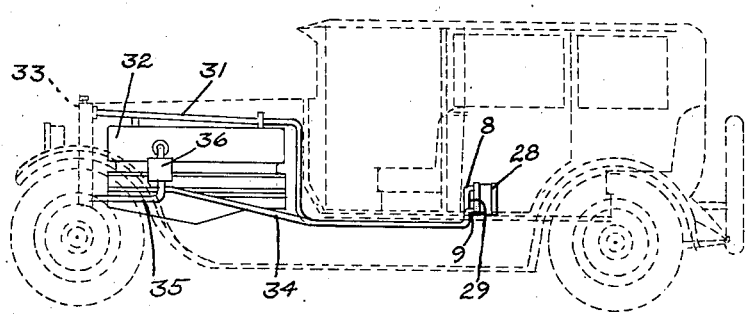
Fig. 3
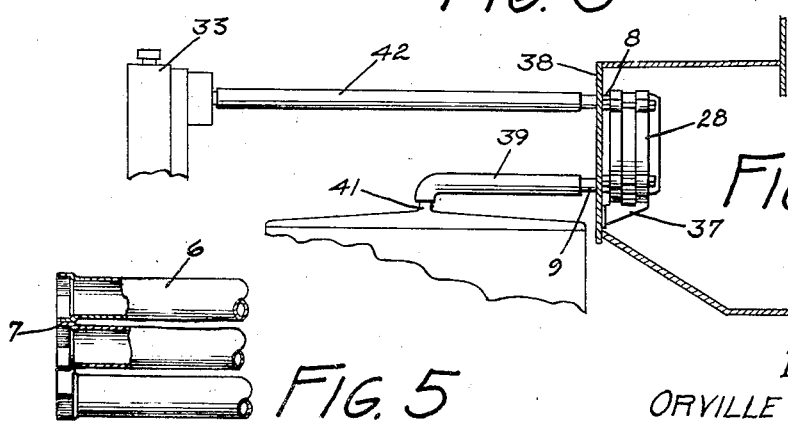
Fig. 4
Fig. 5
INVENTOR  
ORVILLE S. CAESAR  
By *[signature]*  
ATTORNEYS Patented May 1, 1928.

1,668,491

UNITED STATES PATENT OFFICE.

ORVILLE S. CAESAR, OF MINNEAPOLIS, MINNESOTA, ASSIGNOR TO TROPIC-AIRE, INCORPORATED, OF MINNEAPOLIS, MINNESOTA, A CORPORATION OF DELAWARE.

HEATING APPARATUS FOR AUTOMOTIVE VEHICLES.

Application filed February 7, 1927. Serial No. 166,546

This invention relates to an improved apparatus or heating member for heating the interiors of closed vehicles such as sedans, buses, and the like, and an object of the invention is to provide such an apparatus comprising a plurality of air-circulating passages surrounded by water-circulating passages, and having means incorporated therewith for forcibly circulating air through the air-circulating passages for heating the latter and circulating it throughout a vehicle body or other enclosure.

A further object of the invention is to provide a hot water air-heating member adapted for floor-mounting and which is so constructed as to be very compact and small in size, thereby taking up very little space when installed in an automotive vehicle.

A further object is to provide an automobile heating member having means for connecting it with the water-circulating system of an internal combustion engine and having a small electrically operated fan mounted therein for controlling the circulation of air through the water-heated, air-heating member, said fan being operated by a small motor axially mounted within the heating member and having means for controlling the speed thereof to regulate the velocity of the air circulated through the heating member.

The particular object of the invention, therefore, is to provide an improved heating member for heating the interiors of automotive vehicles.

Other objects of the invention will appear from the following description and accompanying drawings and will be pointed out in the annexed claims.

In the drawings there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1 is a vertical sectional view on the line 1—1 of Figure 2;

Figure 2 is a diagrammatic front elevation of the heating member;

Figure 3 is a diagrammatic view showing in dotted lines the outline of an automotive vehicle, and, showing in full lines, the improved air-heating member installed in the rear portion or tonneau of the vehicle and having conduits connecting it with the usual water-circulating system of the vehicle engine;

Figure 4 is a diagrammatic view showing the improved heating member mounted at the forward portion of the vehicle, beneath the usual instrument board thereof and connected in series with the water connection between the top of the vehicle engine and the usual water-cooling radiator thereof; and Figure 5 is a detailed sectional view showing how the air-circulating tubes are connected together at their ends.

The novel heating member featured in this invention comprises a cylindrical casing 5 having a plurality of air-circulating tubes 6 mounted therein, the opposite ends of which are connected together to provide water-tight joints, as shown at 7 in Figure 5. The tubes 6 are spaced apart to provide water-circulating passages therebetween, as shown at the right hand side of Figure 2. By connecting together the ends of the tubes as above described, unobstructed air-circulating passages will be provided through the heating member so that air circulated therethrough, when hot water is flowing through the water-circulating passages therein, will be quickly heated. A water intake 8 is provided at the upper end of the heating member adapted to be connected to a source of water supply, such as the water circulating system of an internal combustion engine, and a discharge pipe or connection 9 is provided at the bottom of the heating member having means for connecting it with the water-circulating system of the engine.

A relatively smaller casing 11 is mounted in the central portion of the heating member and the outer end portions of this casing are suitably connected with the air-circulating tubes 6 so as to provide an annular water chamber therearound which is traversed by the air-circulating tubes 6, as clearly shown in Figures 1 and 2.

Annular flanged frames 12 and 13 are oppositely mounted upon the casing 5 as shown in Figure 1. These frames are suitably secured together by means of tie-bolts 15, received in apertured lugs 16 provided upon the frames 12 and 13, and provide a support for the casing 5 which, it will be seen, is securely clamped therebetween. Legs or feet 17 and 18 are provided respectively upon the frames 12 and 13, as shown in Figures 1 and 2. These feet are apertured to receive bolts 19 for securing them to a bracket or to the floor of the vehicle. (See Figures 1 and 2). The frame 13 has an offset portion 21 connecting it with a grille or guard 22 which is preferably integrally formed therewith and, which is spaced from the adjacent end of the heating member to provide clearance for a fan 23, shown in Figure 1.

The fan 23 is operable by a motor 24 mounted within the central casing 11 of the heating member. The casing 11 has inwardly turned lugs 25 and 26, apertured to receive the tie-bolts 27, securing together the motor-housing or frame. These bolts terminally pass through the lugs 25 and 26 and have nuts secured thereto, thereby fixedly securing the motor to the heating member, as is clearly shown in Figure 1.

By thus mounting the motor 24 within the heating member the over all length of the heating member, as a whole, is considerably decreased, thereby providing such an apparatus of compartively small size which may, therefore, readily be mounted or installed in a motor vehicle without taking up too much room therein. Suitable means such, for instance, as a rheostat are preferably provided for controlling the rotation of the motor-fan 23, so that the forced circulating of air through the air-circulation tubes 6 may be controlled at will. Such means is shown in detail in the pending application of the inventor hereof, Serial No. 166,544, filed February 7, 1927, and it is therefore thought unnecessary to show same in detail in this application.

Figure 3 is a diagrammatic view showing in dotted lines the outline of an automotive vehicle such, for instance, as a taxicab, and showing in full lines the improved heating member mounted in the rear portion or tonneau thereof. In the above figure, the heating member will be referred to by the numeral 28. The intake pipe 8 of the heating member 28 has a conduit 29 connecting it with the water outlet manifold 31, connecting the engine 32 with the radiator 33 of the vehicle. A similar conduit 34 connects the discharge 9 of the heating member with the water connection 35, connecting the usual pump 36 of the water-circulating system of the engine with the lower portion of the water-cooling radiator 33. It will be noted that the discharge conduit 34 of the heating member 28 is connected to the connection 35 ahead of the water-circulating pump 36, thereby causing a forced circulation of water through the heating member, when the engine is functioning. If desired, a valve 36ª, shown conventionally in Fig. 1 of the drawing, may be interposed in the intake conduit 29 of the heating member whereby the supply of water therethrough may be cut off in warm weather, when no heat is required in the vehicle body. During the winter season, however, when the heater is in use, it has been found that the temperature within the vehicle body may be controlled entirely by the circulation of the air therewithin. In other words, when the weather is cold, the fan 23 will be rotated at a relatively high rate of speed, thereby rapidly circulating heated air within the vehicle body, and when the weather is comparatively warm and no artificial heat is required within the vehicle body, the rotation of the fan 23 is interrupted, after which very little heat will be dissipated from the heating member 28, although hot water may be circulating therethrough.

Figure 4 illustrates a modified form of installation wherein the heating member 28 is mounted upon the brackets 37 secured to the dash-board 38 of the vehicle. In this figure, it will be noted that the directional flow of the water through the heating member has been reversed for the reason that the pipe connection 9 at the lower portion thereof has a conduit 39 connecting it directly with the water discharge connection 41 of the engine; and the pipe connection 8 at the upper portion thereof has a conduit 42 connecting it directly with the water-cooling radiator 33 of the vehicle. By thus connecting the heating member 28 in series with the conduits 39 and 42, all of the water circulating through the water-jacket of the engine and the radiator 33 will be circulated through the heating member 28.

I claim as my invention:

1. A device of the class described, comprising a casing, a plurality of air-circulating tubes mounted therein in spaced relation and having their ends open to the atmosphere, water-circulating passages between said tubes, a cylindrical wall centrally mounted in said casing to provide an enlarged opening therethrough, water intake and discharge connections for the casing, an electric motor mounted in said central opening, and a fan operatively connected with said motor and adapted to forcibly circulate air through said air-circulating passages.

2. A device of the class described, comprising a casing, a plurality of air-circulating tubes mounted therein in spaced relation and having their ends open to the atmosphere, water circulating passages between said tubes, a cylindrical wall centrally mounted in said casing to provide an enlarged opening therethrough, water intake and discharge connections for the casing, an electric motor mounted in said central opening, inwardly turned lugs on said cylindrical wall for securing the motor thereto, and a fan operatively connected with said motor and adapted to forcibly circulate air through said air-circulating passages.

3. A device of the class described comprising a casing, a plurality of air-circulating tubes traversing said casing, an enlarged central opening through said casing, flanged frame members encircling the end portions of said casing, means for securing together said frame members, an electric motor mounted within said central opening, a fan adjacent one end of the casing and directly connected with said motor, and a guard integrally formed with one of said frame members and substantially concealing said fan.

4. A device of the class described, comprising an annular casing, a plurality of air-circulating tubes traversing said casing and arranged in spaced relation to provide water-circulating passages therebetween, water intake and discharge connections for said casing, flanged frame members oppositely mounted upon said casing, tie-bolts securing the frame members to the casing, a cylindrical wall centrally mounted in said casing to provide an enlarged opening therethrough, an electric motor mounted in said opening, a fan operable by the motor to circulate air through said air-circulating passages, and said frame members having means for securing the frame to a suitable support.

5. A hot-fluid air-heater and air-circulator unit, comprising a fluid receiving chamber provided with intake and discharge openings for communication with the cooling system of a motor-driven vehicle, tubes extending through said fluid receiving chamber and open to atmosphere for circulation of air through the tubes under the influence of heat-exchange between the air and the fluid in said chamber, a motor located within the air-heater, and a fan operatively connected with said motor and positioned externally of the heater for moving air through the tubes of the air-heater, said air-heater and air-circulator being adapted for installation as a unit within the body of a vehicle through which is to be circulated air moved through said tubes.

6. A hot-fluid air-heater and air-circulator unit comprising a fluid receiving chamber provided with intake and discharge openings for communication with the cooling system of a motor-driven vehicle, tubes extending through said fluid receiving chamber and open to atmosphere for circulation of air through the tubes under the influence of heat exchange between the air and the fluid in said chamber, an electric motor located within the air-heater, and a fan operatively connected with said motor to have its rotation governed from the motor and positioned externally of the heater for moving air through the tubes of the air-heater and within the body of a vehicle in which air moved through the tubes is to be circulated, and means for cutting-off the circulation of the fluid medium between the cooling system and the air-heater of the unit.

In witness whereof, I have hereunto set my hand this 5th day of February, 1927.

ORVILLE S. CAESAR.